(12) United States Patent
Kamensky et al.

(10) Patent No.: US 10,130,074 B1
(45) Date of Patent: Nov. 20, 2018

(54) POOP PICKUP TOOL

(71) Applicants: Cristine Kamensky, Castro Valley, CA (US); Kenneth A. Tarlow, San Rafael, CA (US)

(72) Inventors: Cristine Kamensky, Castro Valley, CA (US); Kenneth A. Tarlow, San Rafael, CA (US)

( * ) Notice: Subject to any disclaimer, the term of this patent is extended or adjusted under 35 U.S.C. 154(b) by 0 days.

(21) Appl. No.: 15/731,812

(22) Filed: Aug. 7, 2017

(51) Int. Cl.
 E01H 1/12 (2006.01)
 A01K 23/00 (2006.01)

(52) U.S. Cl.
 CPC ......... *A01K 23/005* (2013.01); *E01H 1/1206* (2013.01); *E01H 2001/128* (2013.01); *E01H 2001/1246* (2013.01); *E01H 2001/1293* (2013.01)

(58) Field of Classification Search
 CPC .......... E01H 1/1206; E01H 2001/1226; E01H 2001/1246; E01H 2001/128; E01H 2001/1293; A01K 23/005
 USPC .......................................... 294/1.3, 1.4, 1.5
 See application file for complete search history.

(56) References Cited

U.S. PATENT DOCUMENTS

| | | | | | |
|---|---|---|---|---|---|
| 4,221,415 | A | * | 9/1980 | Ganz | E01H 1/1206 294/1.4 |
| 4,529,236 | A | * | 7/1985 | Vogt | E01H 1/1206 220/351 |
| 4,830,419 | A | * | 5/1989 | Watanabe | E01H 1/1206 15/104.8 |
| 5,193,870 | A | * | 3/1993 | MacInnis | E01H 1/1206 294/1.4 |
| 6,135,519 | A | * | 10/2000 | Kotlinski | E01H 1/1206 15/257.6 |
| 6,527,320 | B1 | * | 3/2003 | Gregg | E01H 1/1206 15/257.6 |
| 7,753,322 | B1 | * | 7/2010 | Peterson | B65F 1/1415 248/100 |
| 2004/0145196 | A1 | * | 7/2004 | Katz | E01H 1/1206 294/1.4 |

* cited by examiner

*Primary Examiner* — Dean J Kramer

(57) ABSTRACT

A poop pickup tool with a first and second flexible panel, a handle sheet holding member and a frame retaining bracket. The first and second panels each have a diamond shaped frame member at their distal end. The first panel has a hand grip at its proximal end. Flat holding brackets slidably retain the first panel and second panels. The second panel has a perpendicularly disposed handle portion. The frame retaining bracket is attached to the second panel at the lower end of the frame member so that a user can place the first and second diamond shaped frame members over a plastic sheet that covers a portion of poop and then slide the first panel backward to trap the plastic sheet and enclose the poop between the rear portion of the first frame and the front portion of the second frame.

5 Claims, 7 Drawing Sheets

POOP PICKUP TOOL

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of poop pickup tools and more specifically to a poop pickup tool that traps and holds poop in a hands-free manner until it can be properly disposed of.
When people walk their dogs, it is necessary for them to have a means to pick up and dispose of poop that is excreted from the dog.
A common method of doing this is to place a plastic bag over the poop and physically pick it up by hand and then dispose of the poop and bag in a trash container.
However, there is a deficiency in this process in that the user is forced to bend down completely to the location of the poop and to then round up the fresh warm poop with the plastic bag which can be a disagreeable activity because of the close proximity to the poop and because of the need to completely bend down to the ground to retrieve the poop. There are a variety of poop pickup tools on the market today, however they tend to be bulky and hard to carry during the process of walking a dog. The tools frequently require the user to physically carry the tool during the walk while also holding a leash. Then, after the poop is picked up, the user must carry the bag of poop by hand until a trash receptacle is reached.

BRIEF SUMMARY OF THE INVENTION

The primary object of the invention is to provide a tool for picking up poop that allows the user to use any piece of thin plastic sheet rather than a bag.

Another object of the invention is to provide a tool for picking up poop that is compact and light weight.

Another object of the invention is to provide a tool for picking up poop that includes a storage compartment for holding plastic sheets.

A further object of the invention is to provide a tool for picking up poop that can hold the contained poop safely, in a hands-free manner, until the user can dispose of it.

Yet another object of the invention is to provide a tool for picking up poop that can be hooked onto the user's belt when not in use.

Still yet another object of the invention is to provide a tool for picking up poop that is made of thin plastic so that it can be bent from a straight condition into a curved condition during use.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a poop pickup tool comprising: a first elongate flexible panel, a second elongate flexible panel, a handle sheet holding member, a first panel retaining bracket, a second panel retaining bracket, a frame retaining bracket, said first and second elongate panel both having a diamond shaped frame member at their distal end, said first elongate panel having a hand grip portion at its proximal end, said first and second panel retaining brackets trapping said first and second elongate panels enabling them to be slidably retained, said second elongate panel having an integral perpendicularly disposed handle bracket, said handle sheet holding member fixed to said handle bracket portion, said frame retaining bracket fixedly attached to said second elongate panel at the lower end of said diamond shaped frame member, so that a user can place said first and second diamond shaped frame members over a plastic sheet that covers a portion of poop and then slide said first flexible elongate panel backward to trap said plastic sheet and enclosed poop between the rear portion of said first diamond shaped frame member and the front most portion of said second diamond shaped frame member.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
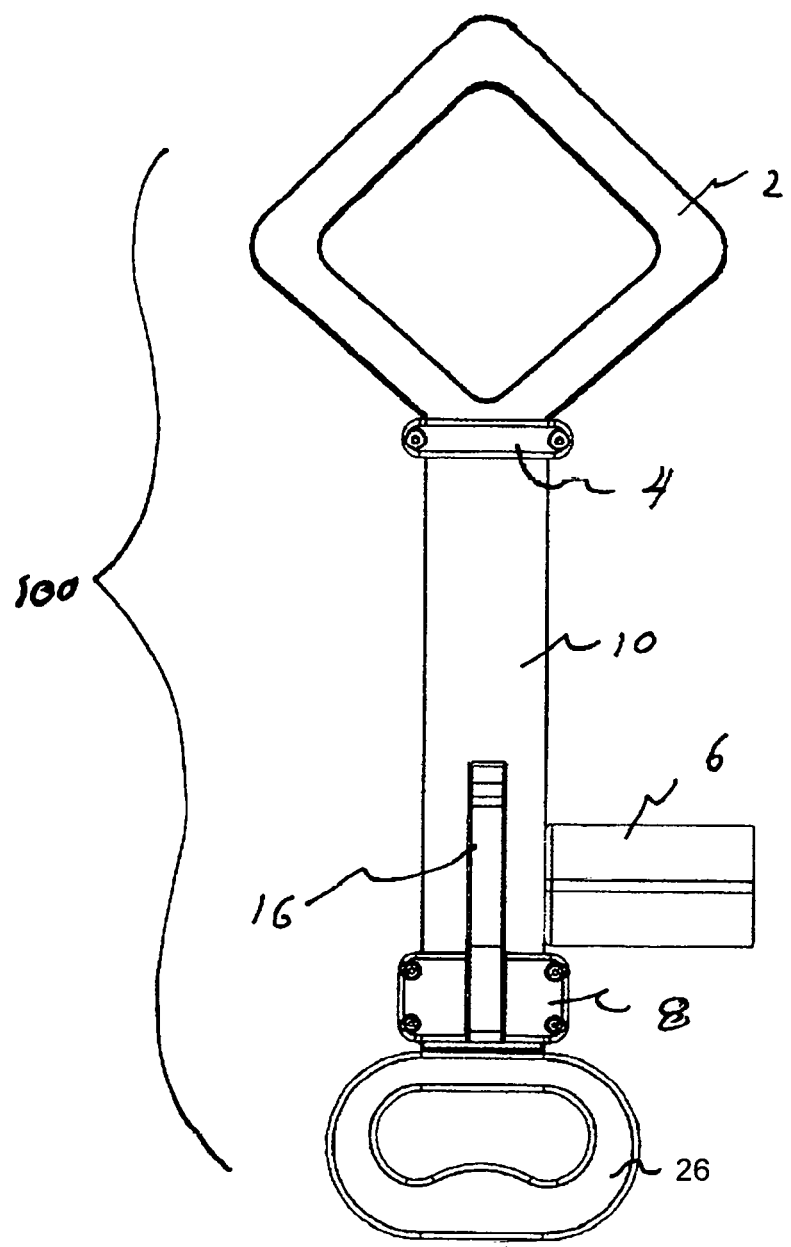
FIG. 1 is bottom plan view of the invention.
Figure 2:
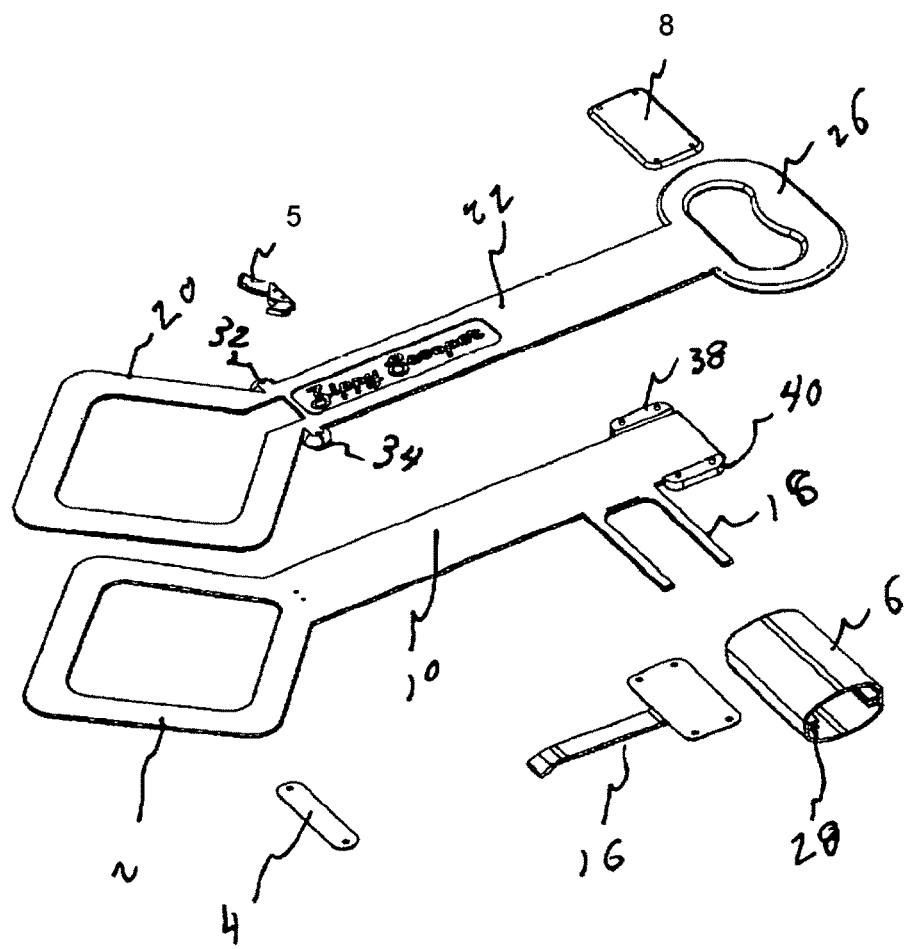
FIG. 2 is an exploded view of the invention.
Figure 3:
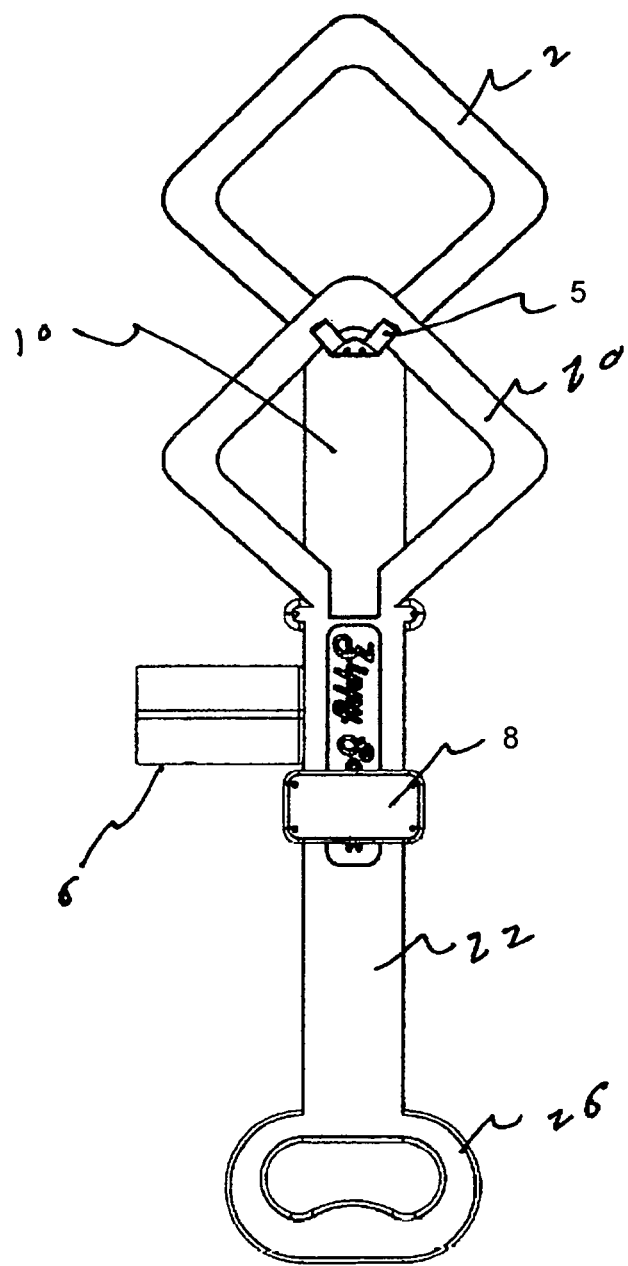
FIG. 3 is a top plan view of the invention in the pulled position.
Figure 4:
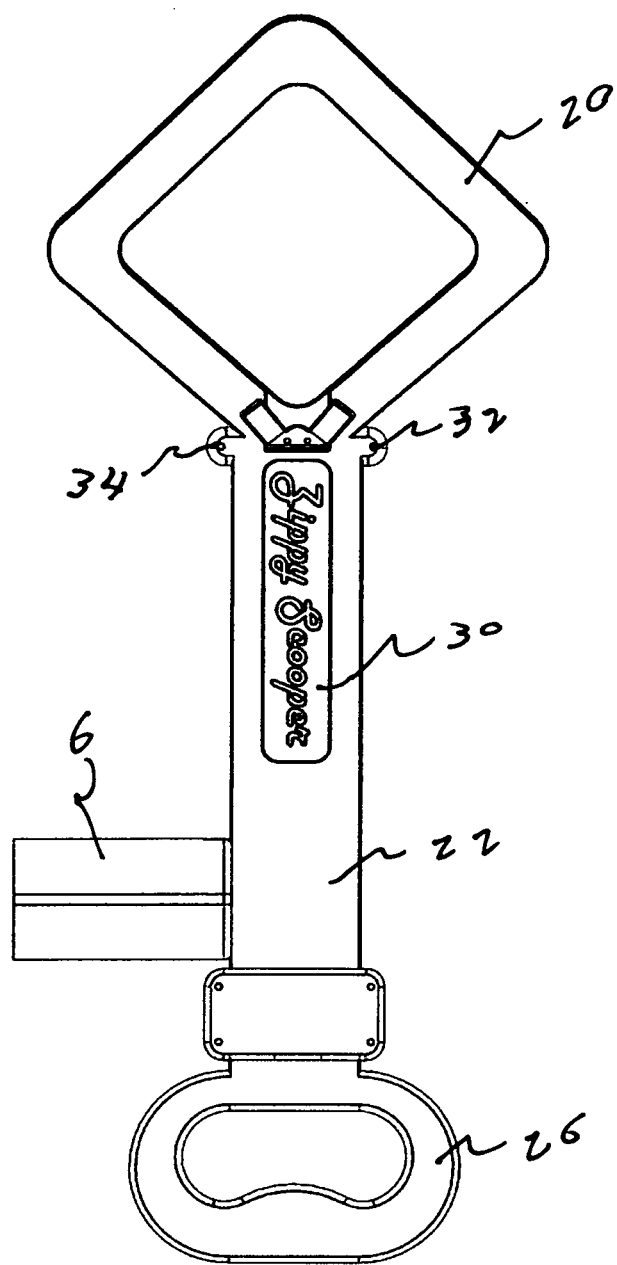
FIG. 4 is a to plan view of the invention in the ready to use position.
Figure 7:
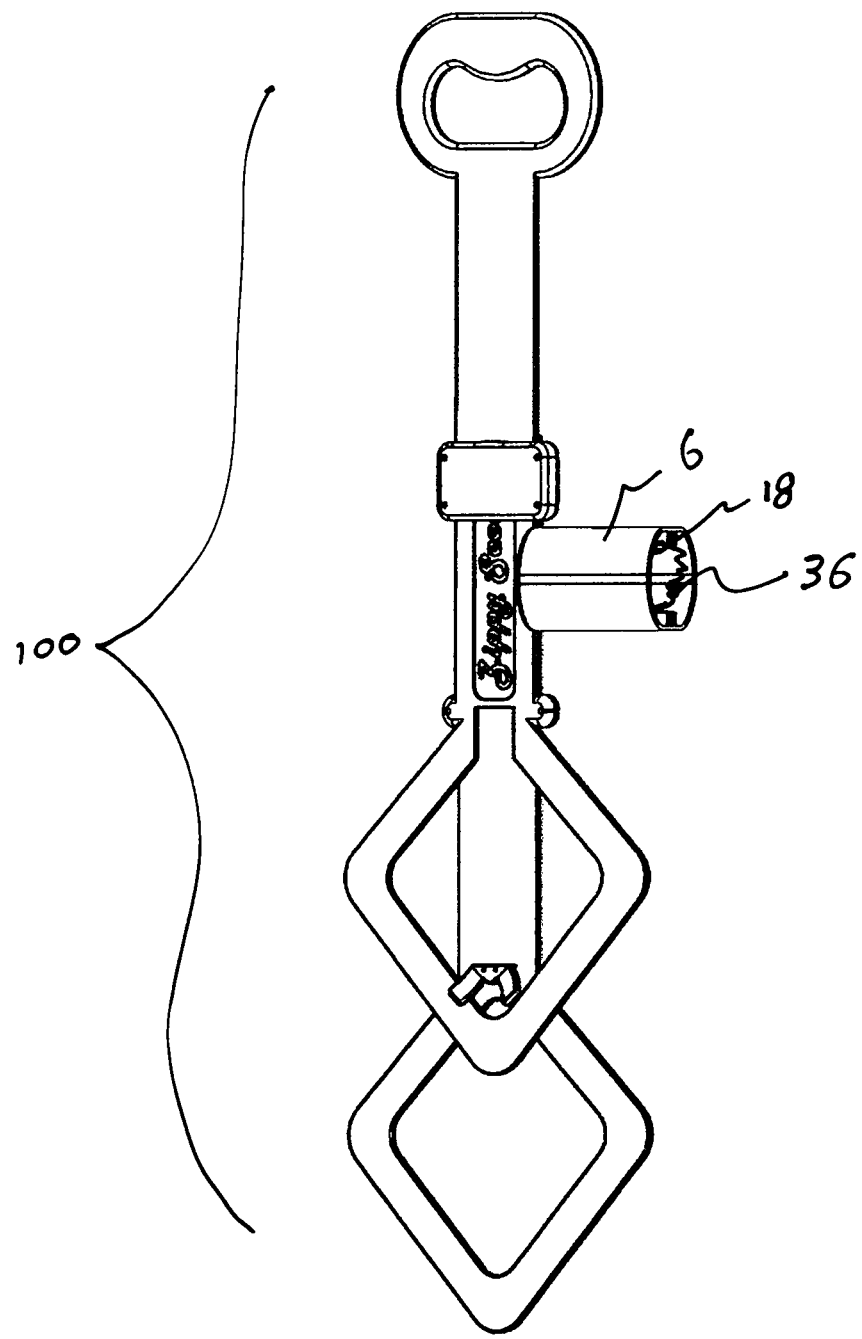
FIG. 7 is a perspective view of the invention showing the bag holding feature.

Referring now to FIG. 1 we see a top plan view of the invention 100. A first frame member 2 is integrally attached to an elongate flexible panel 10. The first elongate flexible panel 10 and diamond shaped frame member 2 overlaps a second elongate flexible panel 22 and diamond shaped frame member 20 as shown in the exploded view in FIG. 2. First panel retaining bracket 4 and second panel retaining bracket 8 are attached to tabs 32, 34 and tabs 38, 40 respectively as shown in the exploded view shown in FIG. 2. Belt hanging member 16 is attached to the outer surface of elongate panel 10. The belt hanging member 16 allows the user to hang the invention 100 on his or her belt so that the invention 100 can be carried in a hands-free manner. Handle sheet holding member 6 is fixed to handle retaining bracket 18. The handle 6 is hollow thereby allowing the user to insert a thin plastic sheet material 36 into the handle 6 as shown in FIG. 7. The sheet material 36 is used in conjunction with the present invention 100 to trap and pick up dog poop as will be described below.

Figure 5:
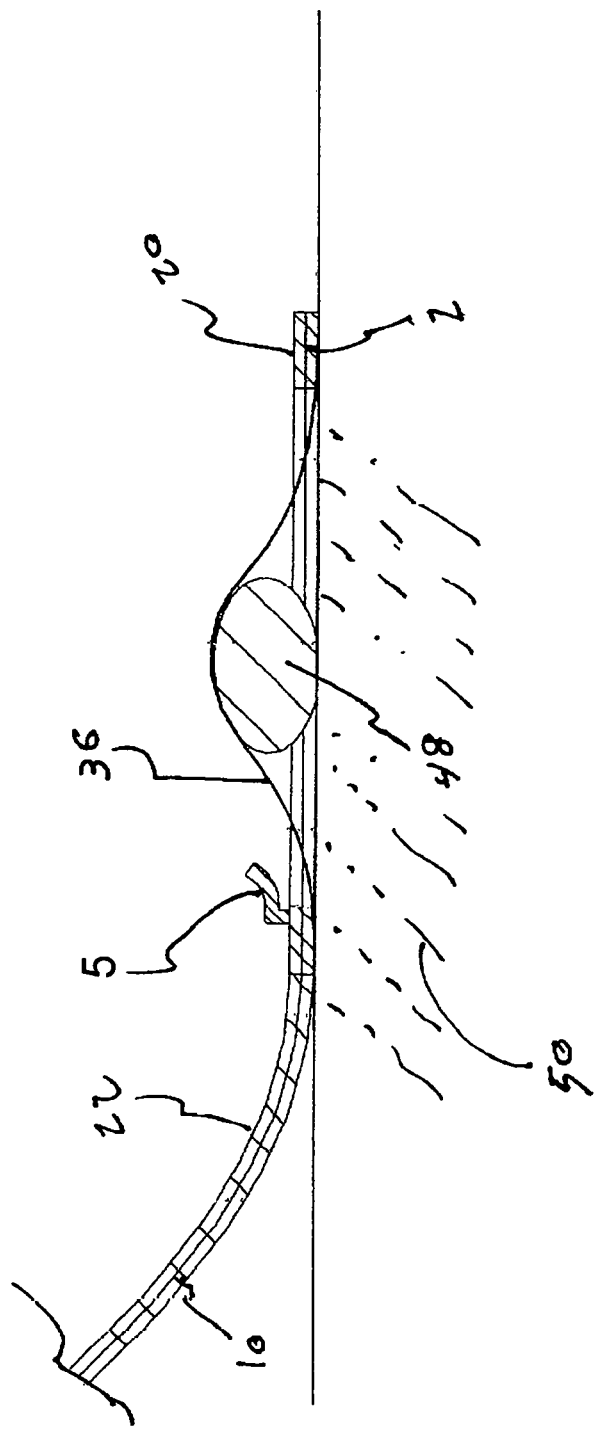
FIG. 5 is a partial section view of the frame before being pulled.
Figure 6:
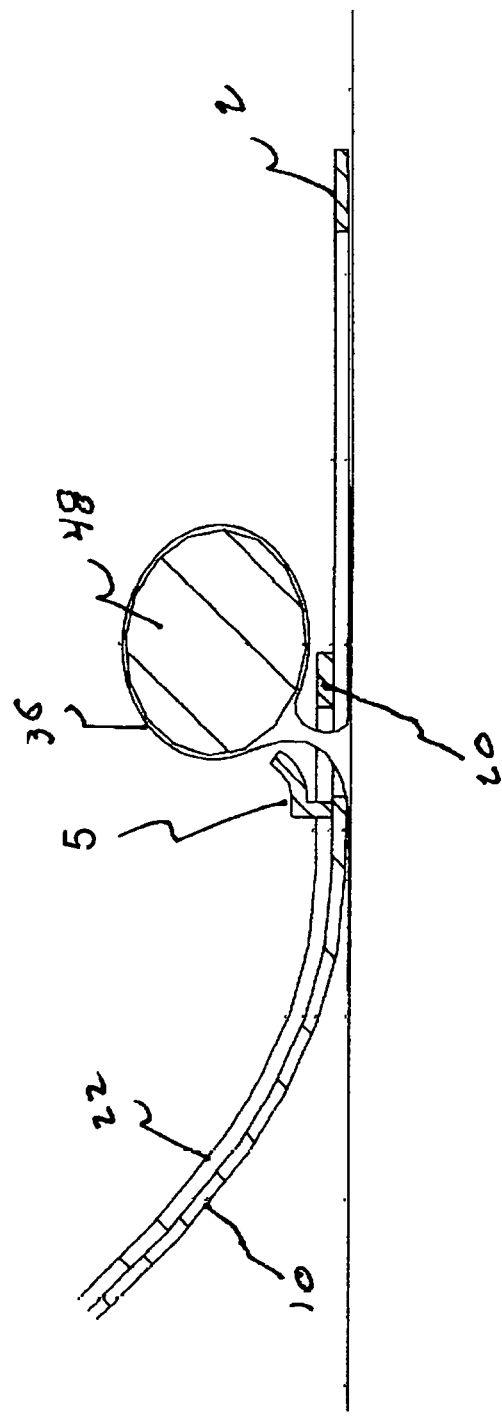
FIG. 6 is a partial section view of the frame after being pulled.

FIG. 5 is a partial section view showing the diamond shaped frame members 2, 20 of the invention and attached elongate panels 10, 22. A flexible sheet of thin plastic 36 has been placed over a portion of dog poop 48. The diamond shaped frame members 2, 20 have been placed over the plastic sheet 36. To trap the poop 48 inside the plastic sheet 36, the user grips handle 6 with one hand and handle grip 26 with the other hand, and then pulls on handle member grip 26 causing frame member 20 to slide over frame member 2 until it is trapped by a frame retaining bracket 5 as shown in the section view in FIG. 6. The elongate panels 22, 10 are flexible so that the user can place the diamond shaped frame members 2, 20 horizontally on the ground 50 while bending the elongate flexible panels 22, 10 up at an angle sufficient for the user to perform the pulling and trapping action.

FIG. 7 is a perspective view of the invention 100 in the pulled position. The user can retain trapped poop while in this position, and hang the device 100 on his or her belt by belt hook 16 until he or she reaches a trash receptacle suitable for disposing of poop.

The invention is light weight, making it easy to carry while walking a dog, and the trapped poop does not touch either the panels of the invention 100 or the hands of the user. In this way, it is a truly touchless method of picking up dog poop, meaning that both the user and the pickup tool 100 remain poop free.

Because the invention 100 is made of two pieces inexpensive injection molded plastic, it is easy and inexpensive to manufacture, and its relatively small size is easy to carry while walking a dog.

Additionally, because the disposal of poop does not require a standard bag, any piece of plastic sheet will work as the poop receptacle, whether it be an old vegetable produce bag, or a single sheet of precut thin plastic will work thereby decreasing the cost per poop pickup in relation to a standard plastic bag In the above described way, the present invention 100 provides an effective way for a person to pick up poop and to carry the encased poop in a hands-free fashion until it can be disposed of in a trash receptacle.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Poop pickup tool comprising:
   a first elongate flexible panel;
   a second elongate flexible panel;
   a handle sheet holding member;
   a first panel retaining bracket;
   a second panel retaining bracket;
   a frame retaining bracket;
   said first and second elongate flexible panel both having a diamond shaped frame member at their distal end;
   said second elongate flexible panel having a hand grip portion at its proximal end;
   said second elongate panel having outwardly extending tabs that receive and secure said first panel retaining bracket and said first elongate panel having outwardly extending tabs that receive and secure said second panel retaining bracket allowing said first elongate panel to slide over said second elongate panel;
   said first elongate panel having an integral perpendicularly disposed handle bracket portion;
   said handle sheet holding member fixed to said handle bracket portion;
   said frame retaining bracket fixedly attached to said second elongate panel at the lower end of said diamond shaped frame member; and so that a user can place said first and second diamond shaped frame members over a plastic sheet that covers a portion of poop residing within the confines of said first and second frame members and then slide said first elongate flexible panel backward to trap said plastic sheet and enclosed poop between the rear portion of said first diamond shaped frame member and the front most portion of said second diamond shaped frame member.

2. A poop pickup tool as claimed in claim 1 further comprising a belt hook member secured to said first elongate panel proximal end to allow a user to hang said poop pickup tool onto the user's belt.

3. A poop pickup tool as claimed in claim 1 wherein said handle sheet holding member includes a hollow space for the storage of thin, flexible sheets of plastic.

4. A poop pickup tool as claimed in claim 1 wherein said first and second elongate panels are made of thin plastic allowing them to bend so that the said diamond shaped frame members can be placed in a horizontal orientation on the ground while the second elongate panel hand grip portion is angled up at an angle during use.

5. A poop pickup tool as claimed in claim 1 wherein said first and second elongate panels are made of injection molded plastic that have a resilient nature allowing them to bend during use.

* * * * *